United States Patent
Strasswiemer et al.

(10) Patent No.: US 10,865,907 B2
(45) Date of Patent: Dec. 15, 2020

(54) SOLENOID VALVE

(71) Applicant: Buerkert Werke GmbH & Co. KG, Ingelfingen (DE)

(72) Inventors: Ralf Strasswiemer, Ingelfingen (DE); Markus Herrmann, Ingelfingen (DE); Daniel Beck, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 63 days.

(21) Appl. No.: 16/296,537

(22) Filed: Mar. 8, 2019

(65) Prior Publication Data

US 2019/0277422 A1    Sep. 12, 2019

(30) Foreign Application Priority Data

Mar. 8, 2018 (DE) .................. 10 2018 105 348

(51) Int. Cl.
 *F16K 31/06* (2006.01)
 *F16K 39/02* (2006.01)

(52) U.S. Cl.
 CPC ...... *F16K 31/0693* (2013.01); *F16K 31/0655* (2013.01); *F16K 39/02* (2013.01)

(58) Field of Classification Search
 CPC .. F16K 31/0693; F16K 31/0655; F16K 39/02; F16K 39/022
 See application file for complete search history.

(56) References Cited

U.S. PATENT DOCUMENTS

| | | | |
|---|---|---|---|
| 4,231,548 A | 11/1980 | Braukmann | |
| 4,930,747 A * | 6/1990 | Nakamura | F16K 31/0655 251/129.15 |
| 5,564,394 A | 10/1996 | Wood | |
| 6,505,812 B1 * | 1/2003 | Anastas | F16K 31/0693 251/129.07 |
| 2004/0011311 A1 | 1/2004 | Takahashi | |
| 2004/0113113 A1 | 6/2004 | Krimmer et al. | |
| 2014/0032690 A1 | 1/2014 | Ramarao et al. | |
| 2014/0326909 A1 | 11/2014 | Ding et al. | |

FOREIGN PATENT DOCUMENTS

| | | |
|---|---|---|
| DE | 69412422 T2 | 12/1998 |
| EP | 1970610 A1 | 9/2008 |
| GB | 905024 A | 9/1962 |

* cited by examiner

*Primary Examiner* — Eric Keasel
(74) *Attorney, Agent, or Firm* — Dilworth IP, LLC

(57) ABSTRACT

A solenoid valve has a housing, which has a fluid inlet and a fluid outlet, and an electromagnetic drive, which comprises a solenoid with a fixed core and a movable armature, wherein the armature interacts with a valve seat. A pressure compensation chamber which is bordered by a membrane is formed in the armature, wherein the pressure compensation chamber is in fluid connection in terms of flow with the fluid inlet by means of a pressure compensation channel.

16 Claims, 4 Drawing Sheets

SOLENOID VALVE

FIELD OF THE INVENTION

The invention relates to a solenoid valve.

BACKGROUND

In order to make it possible to open and close a valve independently of the fluid pressure present, even with comparatively small drives, it is known to provide pressure relief in the valve.

The object of the invention is to achieve a space-saving pressure relief which allows a compact solenoid valve with a small installation space to be provided.

SUMMARY

The present invention provides a solenoid valve comprising a housing, which has a fluid inlet and a fluid outlet, and an electromagnetic drive, which has a solenoid with a fixed core and a movable armature, wherein the armature interacts with a valve seat. A pressure compensation chamber which is bordered by a membrane is formed in the armature, wherein the pressure compensation chamber is in fluid connection in terms of flow with the fluid inlet by means of a pressure compensation channel.

The armature is pulled in the direction towards the core by energization of the solenoid, and thus moved in a lifting direction, which normally coincides with a longitudinal direction of the core, which is often also a longitudinal direction of the housing. At the end of the armature facing away from the core, as a rule, a seal is provided, which rests on a valve seat and then seals the fluid inlet when the valve is closed.

As the pressure being applied at the fluid inlet is transmitted into the pressure compensation chamber, the force acting on the armature, which must be overcome to move the armature, reduces. For this, it is favourable if the pressure compensation channel is permanently open, thus the fluid pressure present at the fluid inlet also permanently acts in the pressure compensation chamber.

Because of its integration in the armature, the pressure compensation chamber can be in fluid connection with the fluid inlet in a space-saving manner with little outlay.

The membrane is accommodated completely within the armature.

The membrane can be used to deflect the force acting on the armature because of the fluid pressure into the valve housing.

The housing is preferably formed magnetically conductive and at the same time forms a part of the magnetic circuit.

The force exerted on the armature by the fluid pressure can be introduced into the housing for example via a fixed support component, wherein the support component is provided with a bearing surface against which a supporting surface of the membrane rests on its side facing the core. The supporting surface of the membrane preferably rests against the bearing surface both in the open and in the closed state of the valve.

The bearing surface, in particular its surface normal, advantageously points in the axial direction of the core or of the housing, which coincides with the lifting direction of the armature, with the result that the force acting on the armature via the fluid pressure can be compensated for completely as far as possible, in order to relieve the pressure on the armature.

The supporting surface is preferably provided in the centre of the membrane. The circumferential edge of the membrane can be fixed to the armature securely and in a fluid-tight manner. The supporting surface is advantageously spaced apart from this circumferential fixing of the membrane.

The surface area enclosed by the valve seat, together with the pressure of the fluid present at the fluid inlet, determines the force acting on the armature. The dimensions of the supporting surface of the membrane and also of the bearing surface on the support component are preferably chosen such that they are substantially the same size as the surface area of the fluid inlet enclosed by the valve seat, or are slightly smaller. The forces acting on the armature due to the fluid pressure at the fluid inlet and within the pressure compensation chamber can hereby be almost completely compensated for in particular in the closed state of the valve.

The support component can be connected to the core in order to achieve a space-saving arrangement. In this way, an arrangement of the bearing surface in the centre of the membrane also results in a simple manner.

Unlike the core, however, the support component should be formed from a non-magnetic material in order to prevent an unwanted magnetic leakage flux between the support component and the armature.

The membrane can have an annular protrusion which points towards the core and surrounds the supporting surface. The protrusion is preferably formed in the shape of a closed ring which protrudes in a raised manner from the surface of the membrane. Apart from the protrusion, the membrane can be substantially flat.

The protrusion ensures a centering of the supporting surface on the bearing surface. There is no need for a further connection, in particular a secure fixing of the membrane on the support component.

Moreover, the force effect on the membrane during opening and closing of the valve, thus during movement of the armature, can be reduced via the geometry of the protrusion.

For this, for example, an inclination of an outer circumferential edge of the protrusion is chosen to be substantially equal to an inclination of a contact surface on the armature opposite this circumferential edge. Alternatively or additionally, an inclination of an inner circumferential edge of the protrusion can be chosen to be substantially equal to an inclination of a contact surface on the fixed support component opposite this circumferential edge. The contact surface on the support component surrounds the bearing surface. When the valve is actuated, the membrane then rolls along the contact surface on the armature or the contact surface on the fixed support component during the movement of the armature, which reduces wear on the membrane.

The angle enclosed by the contact surfaces, and accordingly the circumferential edges of the protrusion, and the longitudinal direction of the core can lie between 5° and 85° and preferably between 15° and 25°.

In a preferred embodiment the armature has an upper part and a lower part, wherein a circumferential edge of the membrane is clamped between the upper part and the lower part. The centre of the membrane with the supporting surface, on the other hand, preferably does not rest against the armature. The upper part is located closer to the core than the lower part is.

The pressure compensation chamber can be formed in a simple manner between the lower part of the armature and the membrane. The sealing of the pressure compensation chamber can be achieved by the clamping of the circumferential edge of the membrane.

For simple manufacture of the armature, it is possible to provide a sleeve, provided with the pressure compensation channel, which presses on the valve seat in the closed state of the valve, wherein a seal is preferably arranged at the end of the sleeve facing the valve seat.

The sleeve can be inserted into an opening in the lower part of the armature and securely connected to the lower part in a suitable manner. In this way the armature can be cost-effectively composed of a few separate, easy-to-manufacture components.

The armature is normally spaced apart from the core of the coil by an air gap. The air gap is preferably wedge-shaped in axial section, wherein the width of the air gap changes in the direction towards the core's longitudinal axis when the solenoid valve is actuated. This makes it possible to realize a proportional characteristic line of the valve. The width of the air gap preferably reduces when the armature is pulled towards the core, in particular during opening of the valve.

An air gap, which is preferably cylindrical in radial section, is normally also provided between the armature and an inner side of the housing of the solenoid valve.

The armature can be held axially displaceable in the housing by means of two axially spaced-apart bearing springs, wherein the bearing springs, because of their flexibility, allow a movement of the armature towards the core when the solenoid is energized and apply a restoring force into the starting position of the armature.

The bearing springs are securely positioned in the axial direction, in particular on their circumferential edge, but are flexible in particular in the axial direction.

This can be achieved, for example, by forming at least one of the bearing springs by at least one flat spring, which is designed flexible in the axial direction and substantially rigid in the radial direction. In particular, several flat springs of the same or different type laid one over another can be provided. Thus, the desired movability of the armature in the axial direction as well as the desired restoring force can be defined in a simple manner with cost-effective means.

The fluid outlet is preferably arranged concentric to the fluid inlet. To deflect the flow, a flow control surface, which constantly deflects the fluid flow between fluid inlet and fluid outlet by approximately 45° to 135°, can moreover be provided between the valve seat and an outer circumferential wall of the fluid outlet.

The fluid inlet and the fluid outlet can lead through a fluid block, wherein the electromagnetic drive sits on the fluid block and surrounds the fluid inlet, in particular the valve seat.

The fluid inlet can be formed in particular by a pipe, which is inserted into the fluid block in the axial direction, thus in the direction of the longitudinal axis of the core and preferably also of the housing, wherein the valve seat is formed by an end face of the pipe. Here too, an advantage results from the use of a few individual parts which are cost-effective to manufacture and simple to assemble.

DETAILED DESCRIPTION

Figure 1:
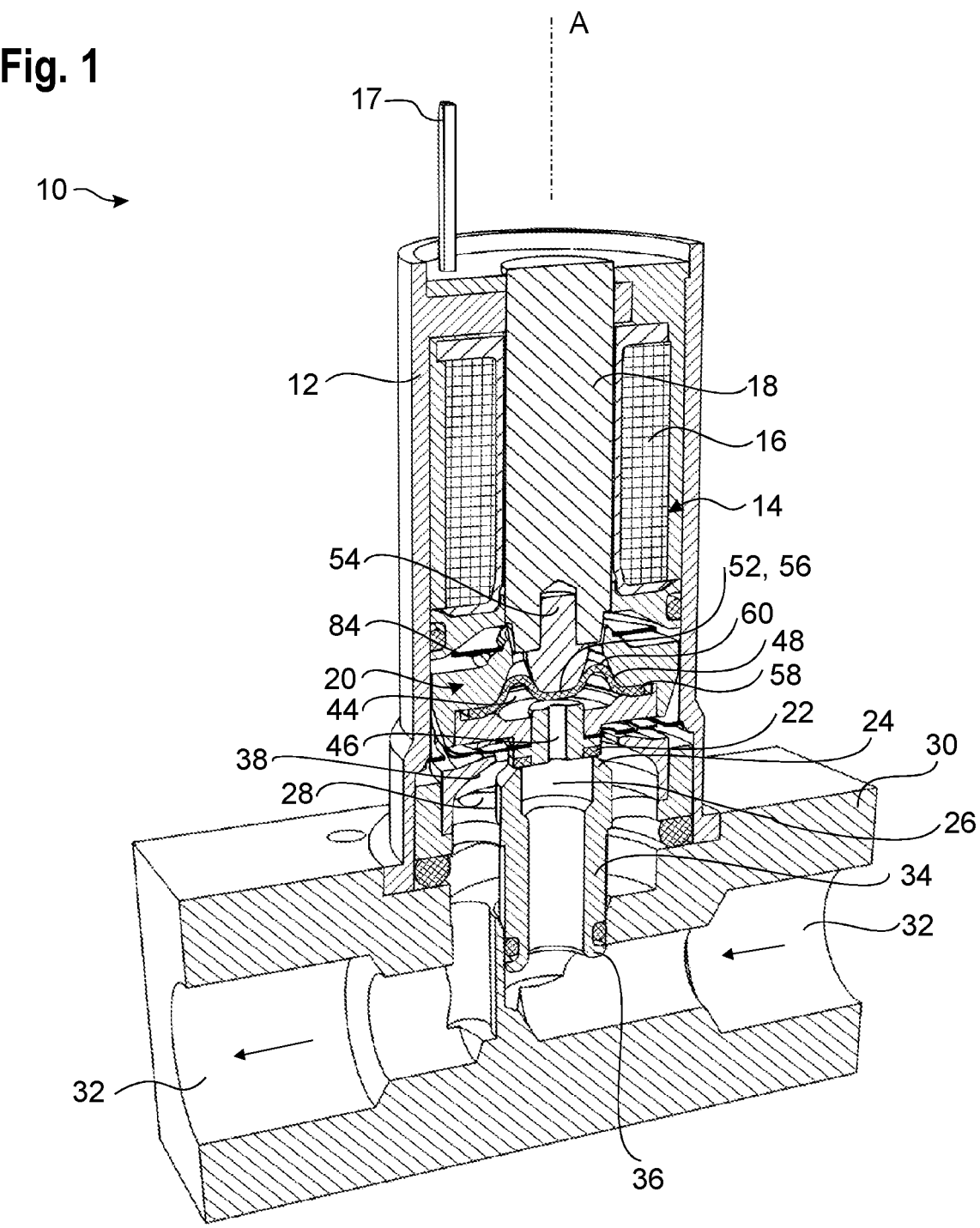
FIG. 1 a schematic sectional view of a solenoid valve according to the invention.

FIG. 1 shows a solenoid valve 10 with a housing 12, which defines a longitudinal axis A, which is also called the axial direction A in the following. An electromagnetic drive 14, which comprises a solenoid 16 with an electrical connection 17 which surrounds a fixed, magnetically conductive core 18, is accommodated in the housing 12. The longitudinal axis of the core 18 here runs in the axial direction A.

An armature 20 which is mounted axially movable and which is likewise part of the electromagnetic drive 14 is arranged below the core 18 in the axial direction A.

The housing 12 is formed magnetically conductive here, with the result that at the same time it serves as a return path for the magnetic circuit of the electromagnetic drive 14.

In this example, the solenoid valve 10 is formed as a normally closed valve, i.e. as long as the solenoid 16 is not energized, the armature 20 is in its position remote from the core 18, and the solenoid valve 10 is closed. For the opening the solenoid 16 is energized and the armature 20 is pulled in the direction towards the core 18, whereby the solenoid valve 10 is opened.

On its side facing away from the core 18 the armature 20 is provided with a seal 22, which interacts with a valve seat 24 on a fluid inlet 26, wherein the seal 22 rests on the valve seat 24 in a sealing manner when the solenoid valve 10 is closed.

Figure 2:
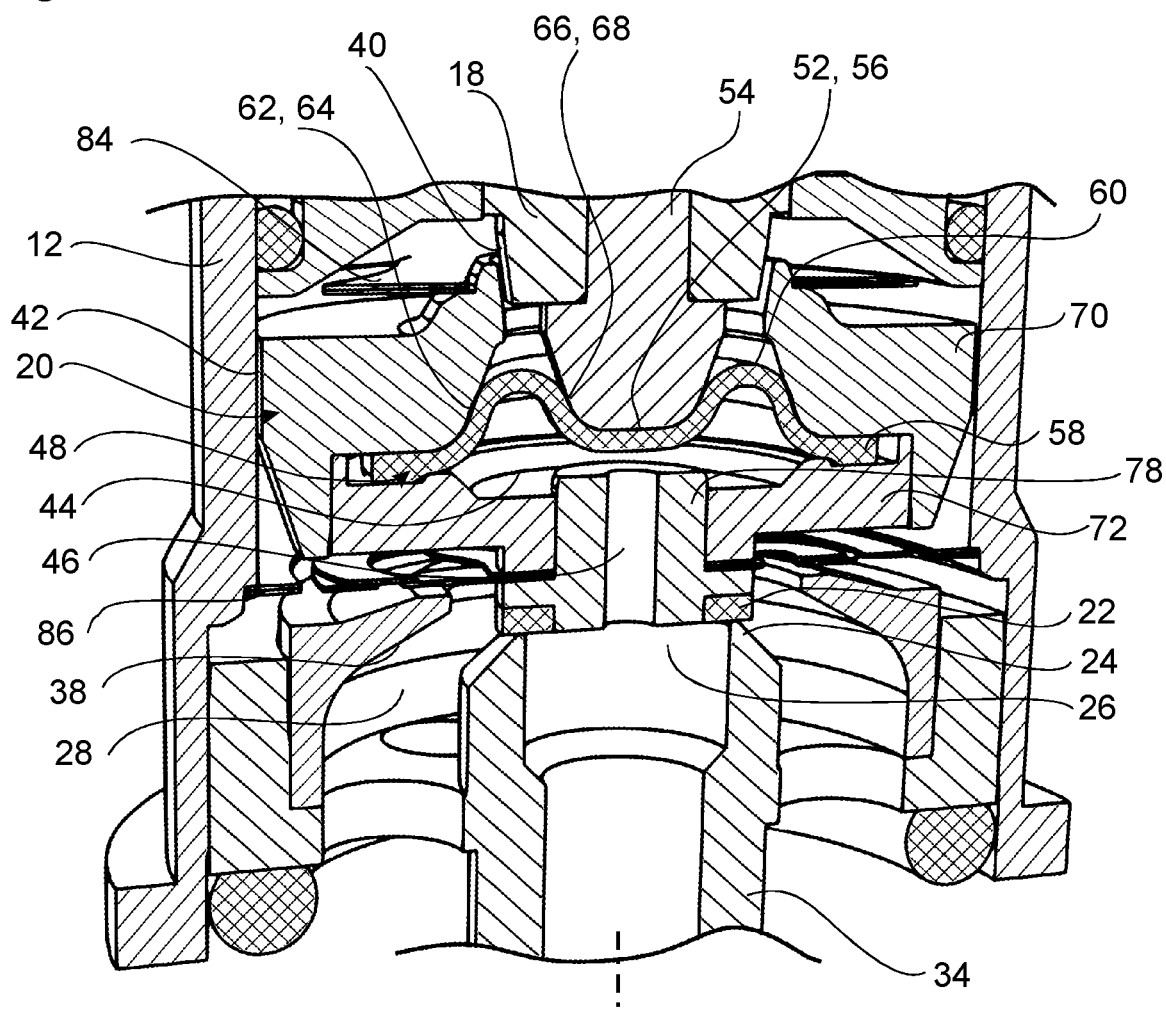
FIG. 2 an enlarged section of the view according to FIG. 1.

The armature 20 is separated from the core 18 by an air gap 40 (see FIG. 2), wherein the air gap 40 is designed wedge-shaped in axial section and is shaped such that the width of the air gap 40 between armature 20 and core 18 reduces when the armature 20 moves in the direction towards the core 18.

A second air gap 42 is formed between an outer circumference of the armature 20 and an inner wall of the housing 12. This air gap 42 is cylindrical here and its width does not change substantially when the armature 20 moves axially (see FIG. 2).

In this example the fluid inlet 26 is surrounded in an annular manner by a fluid outlet 28 (see FIG. 2 again), wherein fluid can overflow from the fluid inlet 26 to the fluid outlet 28 when the armature 20 is raised off the valve seat 24 and the solenoid valve 10 is opened.

If the armature 20 rests on the valve seat 24, the solenoid valve 10 is closed, and a fluid flow from the fluid inlet 26 to the fluid outlet 28 is prevented.

In this example the fluid inlet 26 and the fluid outlet 28 are connected to fluid lines 32 which are formed in a fluid block 30, onto which the housing 12 is fitted in a sealed manner (see FIG. 1). Via the fluid block 30, the solenoid valve 10 can be connected to a fluid system, not shown in more detail.

The fluid inlet 26 is formed by a pipe 34 here, on one end of which the valve seat 24 is formed and the other end 36 of which is inserted into the fluid block 30 in a sealed manner.

The part of the fluid outlet 28 close to the valve seat is still arranged within the housing 12, precisely like the part of the fluid inlet 26 close to the valve seat.

An outer circumferential wall 38 of the fluid outlet 28 is formed as a flow control surface and constantly runs with a radially inward curvature, with the result that the substantially radially aligned flow at the valve seat 24 is deflected by a constant curvature into the axial direction A, thus parallel to the pipe 34.

A pressure compensation chamber 44, which is in permanent flow connection with the fluid inlet 26 via a pressure compensation channel 46, is formed within the armature 20. The pressure present at the fluid inlet 26 is thus also transferred into the pressure compensation chamber 44. The pressure compensation chamber 44 has no outlet or inlet other than the pressure compensation channel 46.

The pressure compensation chamber 44 is bordered towards the core 18 in a fluid-tight manner by a flexible membrane 48. Thus, no fluid can enter other areas of the housing 12 via the pressure compensation chamber 44. The membrane 48 is accommodated completely within the armature 20.

Figure 4:
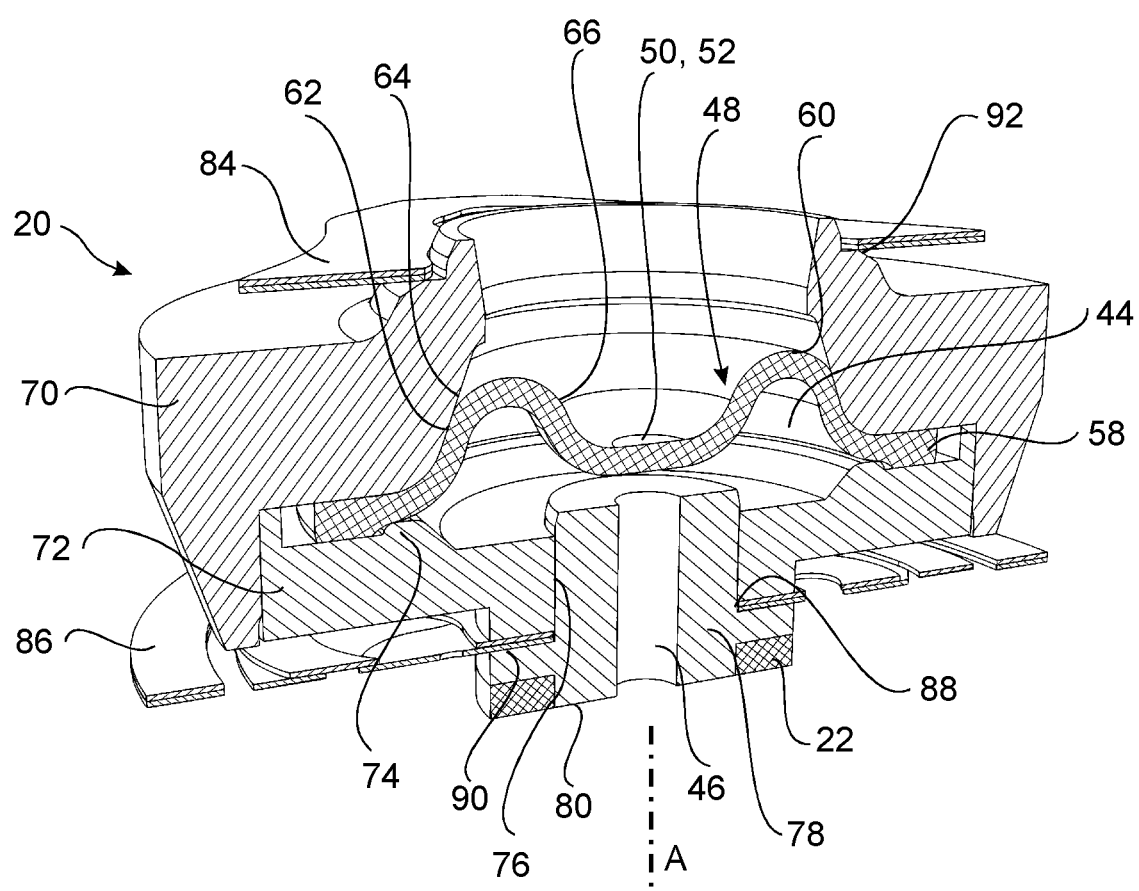
FIG. 4 a schematic sectional view of the armature and of the bearing springs of the solenoid valve according to the invention.

A supporting surface 52, which is substantially flat (see FIGS. 2 and 4), is provided in the centre 50 of the membrane 48. The side of this supporting surface 52 aligned towards the core 18 rests against a support component 54, which is arranged in the axial extension of the core 18 and which has a bearing surface 56 matched to the supporting surface 52 in terms of size and shape.

The support component 54 is securely connected to the core 18 and, like the latter, is arranged fixed in the housing 12. Unlike the core 18, however, the support component 54 consists of a magnetically non-conductive material.

In this example the membrane 48, both in the closed and in the open state of the solenoid valve 10, rests with its supporting surface 52 against the bearing surface 56, thus remains substantially stationary in the centre 50 during movement of the armature 20. The force generated by the pressure in the pressure compensation chamber 44 prevailing on the membrane 48 is thus always introduced into the housing 12 via the support component 54 and the core 18. The fluid forces on the armature 20 substantially cancel each other out. On the one hand, the fluid pressure on the surface area of the armature 20 enclosed by the valve seat 24 pushes the armature 20 in the direction of the core 18. On the other hand, the fluid pressure in the pressure compensation chamber 44 acts on the bearing surface 56 on the support component 54 over approximately the same surface area via the supporting surface 52 of the membrane 48. The pressure of the armature 20 is thus compensated for and the pressure on the solenoid valve 10 is relieved.

The surface area of the fluid inlet 26 enclosed by the valve seat 24 is chosen to be slightly larger here than the supporting surface 52 in the centre 50 of the membrane 48.

The membrane 48 is securely fixed to the armature 20 with its circumferential edge 58, which in particular describes a round outer circumference 58. The circumferential edge 58 of the membrane 48 therefore moves together with the armature 20 in the axial direction A during the opening and closing of the solenoid valve 10, while the centre 50 of the membrane 48 remains on the support component 54. The centre 50 of the membrane 48 does not rest against the armature 20.

The supporting surface 52 of the membrane 48 is surrounded by a protrusion 60, annular here, which is raised in the direction towards the core 18 relative to the supporting surface 52 and relative to the circumferential edge 58. The bearing surface 56 lies within the surface area enclosed by the protrusion 60.

An outer circumferential edge 62 of the protrusion 60 is adapted in terms of its inclination to the inclination of a contact surface 64 on the armature 20, with the result that, at least in the closed state of the solenoid valve 10, the contact surface 64 rests against the outer circumferential edge 62. An inner circumferential edge 66 of the protrusion 60 is correspondingly adapted in terms of its inclination to a contact surface 68 on the support component 54, which surrounds the bearing surface 56 in an annular manner and against which the inner circumferential edge 66 of the membrane 48 rests, at least in the open state of the solenoid valve 10. Because of the matched inclinations, the membrane 48 rolls on the armature 20 as well as on the support component 54, when the armature 20 moves between the closed and the open position of the solenoid valve 10.

Figure 3:
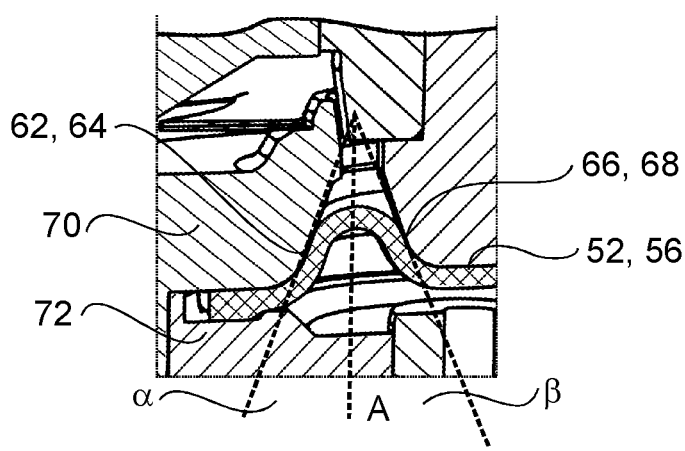
FIG. 3 an enlarged section from FIG. 2.

An angle $\alpha$ between the contact surface 64 on the armature 20 and the axial direction A can be chosen to be between 5° and 85°, in particular between 15° and 25°. An angle $\beta$ between the contact surface 68 on the support component 54 and the axial direction A can lie within the same range and can in particular be chosen to be equal to the angle $\alpha$. This geometry is illustrated in FIG. 3.

All edges in the area of the contact surfaces 64, 68 with which the membrane 48 comes into contact are rounded off with a large radius in order to minimize wear on the membrane 48.

In this example the armature 20 is constructed in several parts and comprises a magnetically conductive upper part 70, which is arranged on the side of the electromagnetic drive 14, as well as a lower part 72, which lies on the side aligned towards the fluid block 30. The circumferential edge 58 of the membrane 48 is secured by clamping between the upper part 70 and the lower part 72 here. The upper part 70 is located closer to the core 18 than the lower part 72 is.

An additional structuring 74 in the lower part 72 and/or in the upper part 70, which lies between the circumferential edge 58 and the protrusion 60 in the radial direction r, can optionally be provided in order to additionally secure the membrane 48.

The lower part 72 has an opening 76, into which a sleeve 78 is inserted, which is securely fixed to the lower part 72 in a suitable manner. The pressure compensation channel 46 is provided in this sleeve 78. The pressure compensation chamber 44 is thus bordered by the membrane 48, the lower part 72 and the sleeve 78.

The circumferential seal 22, which rests on the valve seat 24 and thus seals the fluid inlet 26 when the solenoid valve 10 is closed, is arranged at an end 80 of the sleeve 78 aligned towards the fluid inlet 26.

Figure 5:
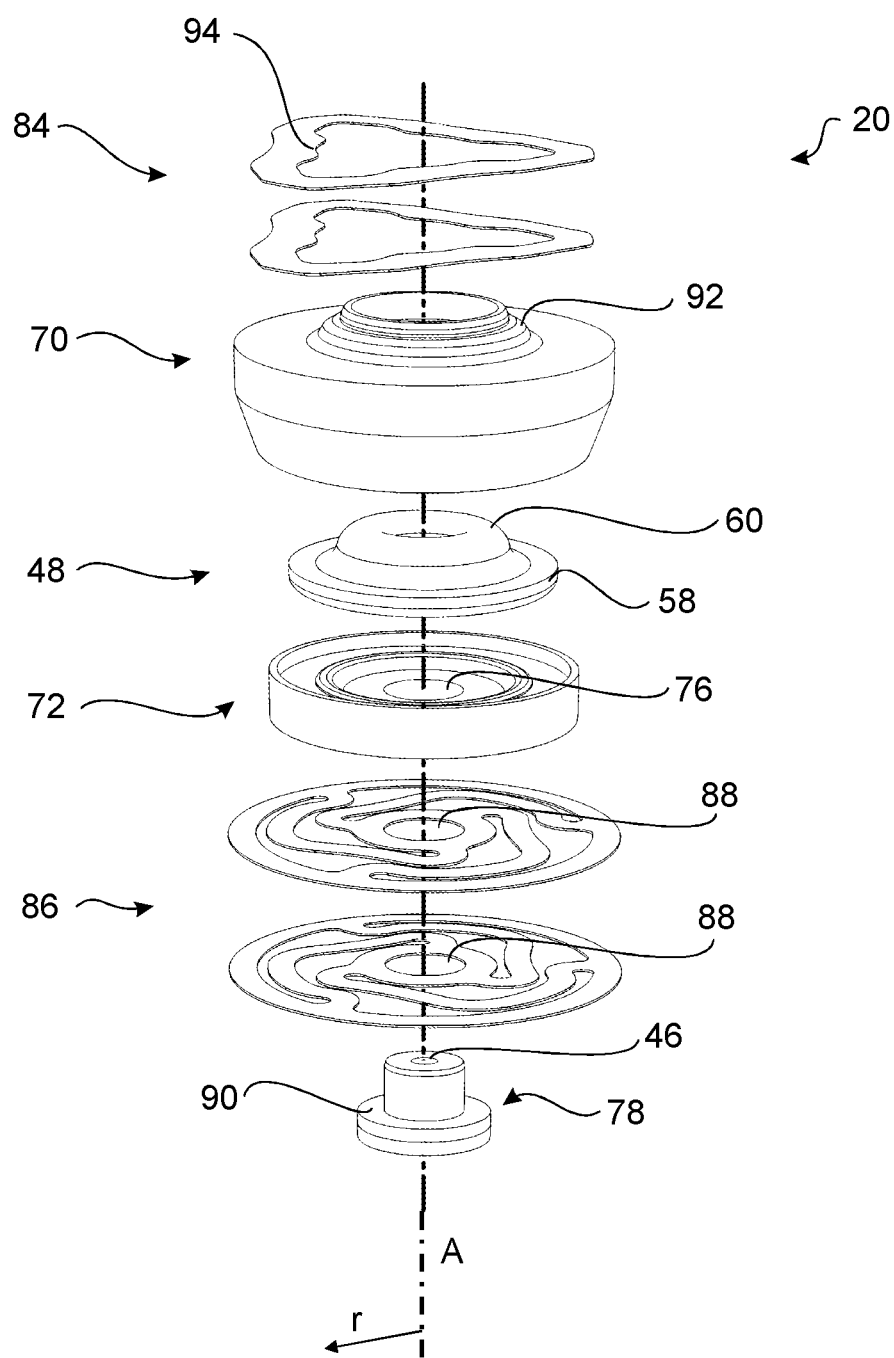
FIG. 5 a schematic exploded view of the armature and of the bearing springs of the solenoid valve according to the invention.

The armature 20 is secured in the housing 12 via two bearing springs 84, 86. Both bearing springs 84, 86 are realized by flat springs here, wherein in each case two opposite flat springs form one bearing spring 84, 86, as can be seen in FIG. 5. This arrangement brings about a higher level of damping of the oscillation movement. Moreover, the value of the restoring force generated by the bearing springs 84, 86 in the closed position can thus be predetermined in a simple manner.

The flat springs of the bearing springs 84 and 86 differ in terms of their shape here. The flat springs on the fluid inlet side, which form the bearing spring 86, have a central passage opening 88, the edge of which is clamped between an underside of the lower part 72 and a shoulder 90 of the sleeve 78, whereby the armature 20 is fixed on the bearing spring 86.

In this example the armature 20 is held against the core-side bearing springs 84 by resting against a shoulder 92 formed on the upper part 70 on radially inner lugs 94 of the flat springs.

On their radial outer circumferences the bearing springs 84, 86 are securely connected in each case in a suitable manner to the inner side of the housing. Both bearing springs 84, 86 are therefore held axially undisplaceable in the housing 12 on their outer circumference, but can move in their centres flexibly in the axial direction A, with the result that the armature 20 can move in the axial direction A. In the radial direction r, on the other hand, all flat springs are formed so rigid that the armature 20 has no room to move in the radial direction r, with the result that the air gaps 40, 42 can be kept narrow.

The two bearing springs 84, 86, viewed in the axial direction A, are arranged on either side of the armature 20 at as great as possible an axial distance, which prevents the armature 20 from tilting in relation to the axial direction A.

The two flat springs which form the bearing spring 86 on the fluid inlet side are moulded identically here, wherein one of the flat springs is arranged rotated 180° perpendicular to the axial direction A relative to the other flat spring. Of course, any suitable shape can be chosen for the flat springs, at the discretion of the person skilled in the art.

The invention claimed is:

1. A solenoid valve with a housing, which has a fluid inlet and a fluid outlet, and an electromagnetic drive, which comprises a solenoid with a fixed core and a movable armature, wherein the armature interacts with a valve seat and wherein a pressure compensation chamber, which is bordered by a membrane, is formed in the armature, wherein the pressure compensation chamber is in fluid connection in terms of flow with the fluid inlet by means of a pressure compensation channel wherein a fixed support component with a bearing surface is provided, against which a supporting surface of the membrane rests on a side facing the core and the supporting surface is provided in the center of the membrane.

2. The solenoid valve according to claim 1, wherein the membrane is accommodated completely within the armature.

3. The solenoid valve Solenoid valve according to claim 1, wherein the support component is connected to the core.

4. The solenoid valve according to claim 1, wherein the support component is formed from a non-magnetic material.

5. A solenoid valve with a housing, which has a fluid inlet and a fluid outlet, and an electromagnetic drive, which comprises a solenoid with a fixed core and a movable armature, wherein the armature interacts with a valve seat and wherein a pressure compensation chamber, which is bordered by a membrane, is formed in the armature, wherein the pressure compensation chamber is in fluid connection in terms of flow with the fluid inlet by means of a pressure compensation channel wherein a fixed support component with a bearing surface is provided, against which a supporting surface of the membrane rests on a side facing the core wherein the membrane has an annular protrusion pointing towards the core, which surrounds the supporting surface.

6. The solenoid valve according to claim 5, wherein an inclination of an outer circumferential edge of the protrusion is substantially equal to an inclination of a contact surface opposite this circumferential edge on the armature and/or an inclination of an inner circumferential edge of the protrusion is substantially equal to an inclination of a contact surface opposite this circumferential edge on the fixed support component.

7. A solenoid valve with a housing, which has a fluid inlet and a fluid outlet, and an electromagnetic drive, which comprises a solenoid with a fixed core and a movable armature, wherein the armature interacts with a valve seat and wherein a pressure compensation chamber, which is bordered by a membrane, is formed in the armature, wherein the pressure compensation chamber is in fluid connection in terms of flow with the fluid inlet by means of a pressure compensation channel, wherein the armature has an upper part close to the core and a lower part remote from the core, wherein a circumferential edge of the membrane is clamped between the upper part and the lower part.

8. The solenoid valve according to claim 7, wherein the pressure compensation chamber is formed between the lower part of the armature and the membrane.

9. The solenoid valve according to claim 1, wherein the armature has a sleeve provided with the pressure compensation channel, which presses on the valve seat in the closed state of the solenoid valve.

10. The solenoid valve according to claim 9, wherein the armature has an upper part and a lower part, wherein a circumferential edge of the membrane is clamped between the upper part and the lower part and in wherein the sleeve is inserted into an opening in the lower part of the armature.

11. The solenoid valve according to claim 1, wherein the armature is spaced apart from the core of the solenoid by an air gap and the air gap is wedge-shaped in axial section, wherein the width of the air gap changes in the direction towards the core's longitudinal axis when the solenoid valve is actuated.

12. The solenoid valve according to claim 1, wherein a cylindrical air gap is provided between the armature and an inner side of the housing.

13. The solenoid valve according to claim 1, wherein the armature is held axially displaceable in the housing by means of two axially spaced-apart bearing springs.

14. The solenoid valve according to claim 13, wherein at least one of the bearing springs is formed by at least one flat spring, which is designed flexible in the axial direction (A) and substantially rigid in the radial direction.

15. The solenoid valve according to claim 1, wherein the fluid outlet is arranged concentric to the fluid inlet and a flow control surface, the fluid control surface being provided between the valve seat and an outer circumferential wall of the fluid outlet, being inclined by 45° to 135° and deflecting the fluid flow between fluid inlet and fluid outlet by 45° to 135°.

16. The solenoid valve according to claim 1, wherein a fluid block is provided, through which the fluid inlet and the fluid outlet lead, wherein the fluid inlet is formed by a pipe which is inserted into the fluid block in the direction of the longitudinal axis of the housing, and the valve seat is formed by an end face of the pipe, wherein the electromagnetic drive sits on the fluid block and surrounds the valve seat.

\* \* \* \* \*